(12) United States Patent
Morrow et al.

(10) Patent No.: US 8,060,701 B2
(45) Date of Patent: Nov. 15, 2011

(54) APPARATUS AND METHODS FOR LOW-COMPLEXITY INSTRUCTION PREFETCH SYSTEM

(75) Inventors: Michael William Morrow, Cary, NC (US); James Norris Dieffenderfer, Apex, NC (US)

(73) Assignee: QUALCOMM Incorporated, San Diego, CA (US)

( * ) Notice: Subject to any disclaimer, the term of this patent is extended or adjusted under 35 U.S.C. 154(b) by 696 days.

(21) Appl. No.: 11/608,309

(22) Filed: Dec. 8, 2006

(65) Prior Publication Data

US 2008/0140996 A1      Jun. 12, 2008

(51) Int. Cl.
    *G06F 12/00*       (2006.01)
    *G06F 15/00*       (2006.01)
(52) U.S. Cl. ........................ 711/137; 712/207
(58) Field of Classification Search .................. 712/207
    See application file for complete search history.

(56) References Cited

U.S. PATENT DOCUMENTS

| 6,728,839 B1* | 4/2004 | Marshall ........................ 711/137 |
| 2003/0105926 A1* | 6/2003 | Rodriguez ..................... 711/129 |
| 2004/0054853 A1* | 3/2004 | Sprangle et al. .............. 711/137 |

FOREIGN PATENT DOCUMENTS

EP            0772123       5/1997

OTHER PUBLICATIONS

David A. Patterson et al. ("Computer Organization and Design: The Hardware/Software Interface"), 2005, Third Edition, pp. 421, 496-497, and 503.*
Webopedia, ("Busrt Mode"), Oct. 31, 2001, pp. 1-4, http://www.webopedia.com/TERM/B/burst_mode.html.*
Jim Handy, ("The Cache Memory Book: The Authoritative Reference on Cache Design"), 1998, Second Edition, pp. 12-13.*
Anonymous;L "Instruction Cache Miss State Machine and Cache Miss Request" IBM Technical Disclosure Bulletin, vol. 32, No. 2, (Jul. 1, 1989), pp. 70-71, XP002475188.
Collins J D et al: "Hardware Identification of Cache Conflict Misses" Micro-32. Proceedings of the 32nd. Annual ACM/IEEE International Symposium on Microarchitecture. Haifa, Israel, Proceedings of the Annual ACM/IEEE International Symposium on Microarchitecture, Los Alamitos, CA; IEEE, Comp. Soc, US, (Nov. 16, 1999), pp. 126-135, XP010364926.
International Search Report-PCT/US07/086254, International Search Authority-European Patent Office-May 7, 2008.
Written Opinion-PCT/US07/086254, International Search Authority-European Patent Office-May 7, 2008.

* cited by examiner

*Primary Examiner* — Hetul Patel
*Assistant Examiner* — Christopher Birkhimer
(74) *Attorney, Agent, or Firm* — Peter M. Kamarchik; Nicholas J. Pauley; Jonathan T. Velasco

(57) ABSTRACT

When misses occur in an instruction cache, prefetching techniques are used that minimize miss rates, memory access bandwidth, and power use. One of the prefetching techniques operates when a miss occurs. A notification that a fetch address missed in an instruction cache is received. The fetch address that caused the miss is analyzed to determine an attribute of the fetch address and based on the attribute a line of instructions is prefetched. The attribute may indicate that the fetch address is a target address of a non-sequential operation. Another attribute may indicate that the fetch address is a target address of a non-sequential operation and the target address is more than X % into a cache line. A further attribute may indicate that the fetch address is an even address in the instruction cache. Such attributes may be combined to determine whether to prefetch.

21 Claims, 3 Drawing Sheets

APPARATUS AND METHODS FOR LOW-COMPLEXITY INSTRUCTION PREFETCH SYSTEM

FIELD OF THE INVENTION

The present invention relates generally to the field of instruction caches and, more specifically, to instruction prefetching on a miss in an instruction cache.

BACKGROUND

Many portable products, such as cell phones, laptop computers, personal data assistants (PDAs) or the like, utilize a processor executing programs, such as, communication and multimedia programs. The processing system for such products includes a processor and memory complex for storing instructions and data. Large capacity main memory commonly has slow access times as compared to the processor cycle time. As a consequence, the memory complex is conventionally organized in a hierarchy based on capacity and performance of cache memories, with the highest performance and lowest capacity cache located closest to the processor. For example, a level 1 instruction cache and a level 1 data cache would generally be directly attached to the processor. While a level 2 unified cache is connected to the level 1 (L1) instruction and data caches. Further, a system memory is connected to the level 2 (L2) unified cache. The level 1 instruction cache commonly operates at the processor speed and the level 2 unified cache operates slower than the level 1 cache, but has a faster access time than that of the system memory. Alternative memory organizations abound, for example, memory hierarchies having a level 3 cache in addition to an L1 and an L2 cache. Another memory organization may use only a level 1 cache and a system memory.

One of the principles behind why a memory hierarchy for instruction caches can be used is that instructions tend to be accessed from sequential locations in memory. By having caches hold the most recently used sections of code, processors may execute at a higher performance level. Since programs also contain branch, call, and return type instructions, and support other non sequential operations such as interrupts, the principle of sequential locality may be maintained only for relatively short sections of code. Due to such non-sequential operations, an instruction fetch to an instruction cache may miss, causing the instruction fetch to be applied to the next higher memory level that operates with a higher memory capacity and slower access time. A miss may cause the processor to stall awaiting the instruction. In order to keep processor performance high, cache miss rates should be low.

An instruction cache is generally constructed with a plurality of instructions located at a single address in the instruction cache. This plurality of instructions is generally called a cache line or simply a line. A miss may occur on an instruction access anywhere in a cache line. When a miss occurs, rather than just fetching the needed instruction, the rest of the cache line, from the missed instruction to the end of the cache line, may also be fetched. In some systems, this technique of prefetching is further extended to always prefetch the rest of the cache line and the next cache line on a miss. This conventional technique of always prefetching the next cache line is based on an assumption that the next cache line contains instructions that will shortly be needed. This presumption of use of instructions in the next cache line remains valid even if, for example, a conditional branch is encountered in the line and the condition causes the branch to fall through to the next sequential instruction. By always prefetching the next cache line, misses may be reduced.

The locality principle of sequential access of instructions of course fails at some point in a program and misses do occur due to non-sequential operations caused by branches, calls and returns, or the like. A miss due to a sequential access may also occur, for example, when an instruction is fetched at the end of a cache line, and the next sequential instruction, which should reside in the next sequential instruction cache line, is not resident in the cache. A miss due to a non-sequential access may occur, for example, when a branch instruction is encountered and the branch causes the program address to change to a new location and the instruction at the new location is not resident in the cache. The conventional technique of always prefetching the next cache line fetches instructions that may not be used and consequently causes unnecessary loss of memory access bandwidth, increased power use, and lower processor performance.

SUMMARY

The present disclosure recognizes that when misses occur, there exists a need for prefetching techniques that reduce miss rates, memory access bandwidth, and power use. One embodiment of the invention provides a method for instruction prefetch. When a miss occurs, a notification is received that a fetch address missed in an instruction cache. An attribute of the fetch address that caused the miss is determined and, based on the attribute, a line of instructions is prefetched.

Another embodiment of the invention addresses an instruction cache and prefetch system. An instruction cache is configured to generate a notification that a fetch address missed. Prefetch decision logic is configured to determine an attribute of the fetch address that caused the miss and prefetch logic is configured to prefetch a line of instructions based on the attribute.

Another embodiment of the invention addresses a memory system. The memory system uses an instruction cache configured to generate a notification that a fetch address missed. Prefetch decision logic is configured to determine an attribute of the fetch address that caused the miss and to generate miss information based on the missed fetch address and the attribute. A system memory hierarchy is configured to respond to the miss information with instructions associated with the missed fetch address.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the present invention. Accordingly, the drawings and detailed description are to be regarded as illustrative in nature and not as restrictive.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Figure 1:
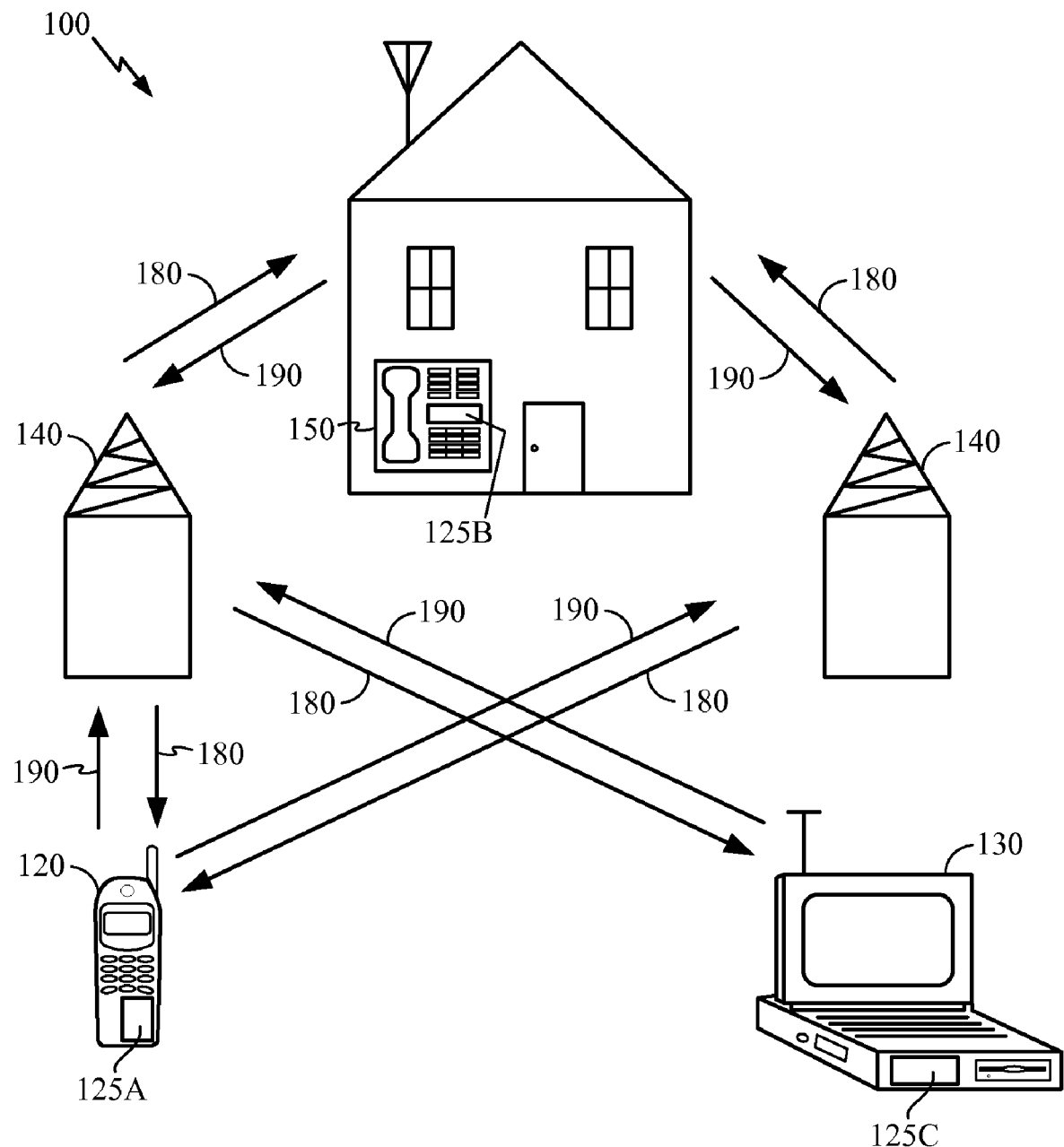
FIG. 1 illustrates a wireless communication system.

FIG. 1 illustrates an exemplary wireless communication system 100 in which an embodiment of the present disclosure may be advantageously employed. For purposes of illustration, FIG. 1 shows three remote units 120, 130, and 150 and two base stations 140. It will be recognized that typical wireless communication systems may have many more remote units and base stations. Remote units 120, 130, and 150 include hardware components, software components, or both as represented by components 125A, 125C, and 125B, respectively, which have been adapted to embody the invention as discussed further below. FIG. 1 shows forward link signals 180 from the base stations 140 to the remote units 120, 130, and 150 and reverse link signals 190 from the remote units 120, 130, and 150 to base stations 140.

In FIG. 1, remote unit 120 is shown as a mobile telephone, remote unit 130 is shown as a portable computer, and remote unit 150 is shown as a fixed location remote unit in a wireless local loop system. For example, the remote units may alternatively be cell phones, pagers, walkie talkies, handheld personal communication systems (PCS) units, portable data units such as personal data assistants, or fixed location data units such as meter reading equipment. Although FIG. 1 illustrates exemplary remote units according to the teachings of the invention, the invention is not limited to these exemplary illustrated units. The invention may be suitably employed in any device having a processor with an instruction cache and a system memory.

Figure 2:
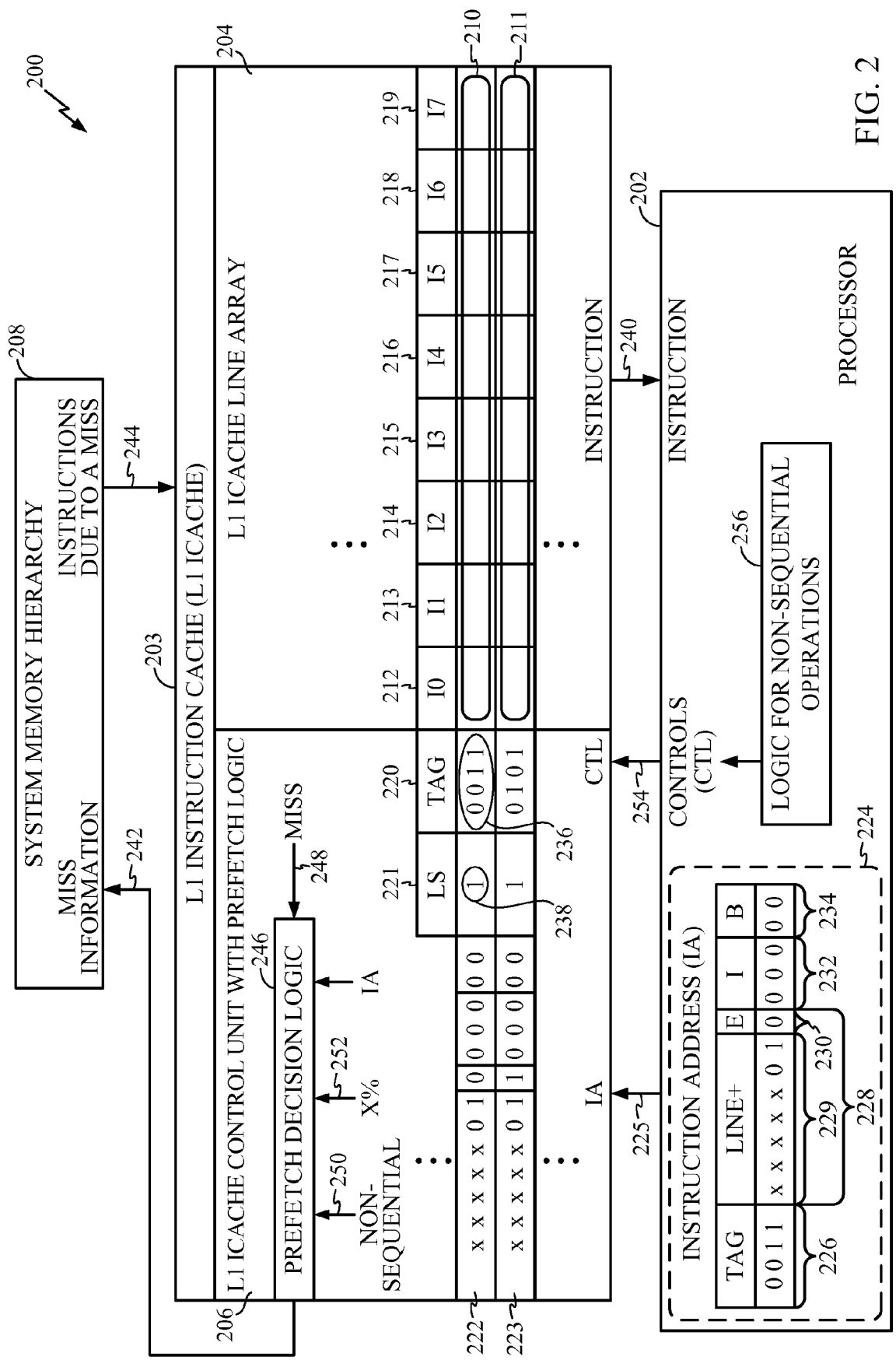
FIG. 2 is a functional block diagram of a processor and memory complex in which prefetching an instruction cache line may be adapted based on heuristics for memory efficient operations.

FIG. 2 is a functional block diagram of a processor and memory complex 200 in which prefetching an instruction cache line may be adapted based on heuristics for memory efficient operation. The processor and memory complex 200 includes a processor 202, a direct mapped level 1 (L1) instruction cache (Icache) 203 comprising an L1 Icache line array 204 and an L1 Icache control unit 206, and a system memory hierarchy 208. The L1 Icache control unit 206 may include prefetch logic and an instruction content addressable memory for instruction tag matching, as may be used in various types of caches, such as, a set associative cache. Peripheral devices, which may connect to the processor complex, are not shown for clarity of discussion. The processor and memory complex 200 may be suitably employed in components 125A-C for executing program code that is stored in the L1 Icache 203 and the system memory hierarchy 208.

The L1 Icache line array 204 may include a plurality of lines, such as cache lines 210 and 211. Each line is made up of a plurality of instructions (I0, I1, . . . , I7) 212-219, respectively. Associated with each line is a tag 220, and line status (LS) 221, such as a valid bit. The cache lines 210 and 211 reside in the L1 Icache line array 204 at line addresses 222 and 223, respectively. The L1 Icache control unit 206 contains address control logic responsive to an instruction address (IA) 224 received over IA interface 225 to access cache lines. The IA 224 may be made up of a tag 226, a line address 228, an instruction "I" field 232, and a byte "B" field 234. The line address 228 is made up of a "line+" field 229 and an even "E" bit 230.

In order to fetch an instruction in the processor and memory complex 200, the processor 202 generates an instruction address (IA) 224 of the desired instruction to be fetched and sends the fetch address to the L1 Icache control unit 206. Based on the received IA 224, the L1 Icache control unit 206 checks to see if the instruction is present in the L1 Icache line array 204. This check is accomplished, for example, through the use comparison logic that checks for a matching tag 236 in line 210 as selected by the IA 224. A determination is also made on whether the line contains valid instructions, by verifying line status bits (LS) 221, such as a valid bit 238. When the instruction is present, a match or a hit occurs and the L1 Icache control unit 206 indicates that the instruction is present in the L1 Icache 203. If the instruction is not present, no match or a miss will be found and the L1 Icache control unit 206 provides a miss indication that the instruction is not present in the Icache 203.

If the instruction is present, the instruction at the instruction fetch address is selected from the L1 Icache line array 204. The instruction is then sent on instruction out bus 240 to the processor 202.

If the instruction is not present in the instruction cache, miss information is provided to the system memory hierarchy 208 over miss signal path 242 indicating a miss has occurred. Upon detecting a miss in the level 1 Icache 203, the processor and memory complex 200 attempts to fetch the desired instruction and, as described in further detail below, may prefetch additional instructions from a higher level of the system memory. For example, instructions may be prefetched from a level 2 (L2) unified cache located in system memory hierarchy 208. The desired instruction due to the miss and any prefetched instructions are provided from the system memory hierarchy 208 on a memory data bus interface 244.

When a miss occurs, one or more attributes associated with the fetch address that caused the miss may be determined. For example, the fetch address may be classified as a target of either a sequential access or a non-sequential access. The fetch address may be further classified according to whether the address is more than X % into a cache line, for example. The fetch address may also be classified based on whether it is an even address in the instruction cache. These and other classifications define attributes which may be combined in the form of heuristics to intelligently determine when to prefetch. By intelligently prefetching, power may be conserved, memory bandwidth may be improved, miss rates may be reduced, and generally processor and system performance may be improved.

The attributes associated with the fetch address that caused the miss may be determined dynamically from the fetch address. For example, by monitoring the fetch address, a sequential fetch address or a non-sequential fetch address may be determined. Based on the fetch address and the cache line length, the position of the access in the cache line may be dynamically determined. This attribute is relevant, for example, when the comparison of the determined position equals or exceeds a X % threshold value. Also, based on the fetch address and the cache line length, a bit in the fetch address may be used to determine whether the access is to an even cache line or an odd cache line. These attributes are described in further detail below.

In one embodiment, on a miss in the instruction cache, if one or more of the miss attributes are relevant, then the next consecutive cache line from the next level of the memory hierarchy is prefetched. If one or more of the miss attributes are not relevant then the next consecutive cache line is not prefetched. It is noted that, in general, a cache line that is not consecutive may be prefetched. The determination of the cache line to prefetch may be based on attributes of the miss, attributes of the program, or a combination of such attributes. For example, information from a branch history table or branch prediction logic might be used to provide attributes of the flow of execution of a program which may be used to determine whether to prefetch a consecutive line of instructions or a non-consecutive line of instructions.

In another embodiment, if the miss in the instruction cache is due to a non-sequential miss, such as a branch, sub-routine call, or the like, to an address of an instruction that is not present in the instruction cache, then a line of instructions from the next level of the memory hierarchy is prefetched. If the miss in the instruction cache is due to a sequential miss, such as a sequential access to an instruction not present in the instruction cache, then a prefetch operation is not done. It is also noted that the address of the prefetch operation may be to a consecutive or non-consecutive line of instructions.

In another embodiment, if the miss in the instruction cache occurs at an address in the instruction cache that is even, then a line of instructions from the next level of the memory hierarchy is prefetched. If the miss in the instruction cache occurs at an address in the instruction cache that is odd, then a prefetch is not done.

In another embodiment, if the miss in the instruction cache is due to a non-sequential miss at an address greater than or equal to X % into the cache line, then a line of instructions from the next level of the memory hierarchy is prefetched. If the miss in the instruction cache is due to a miss at an address less than X % into the cache line or is a sequential miss, then a prefetch is not done. For example, if the miss occurs at a fetch address near the end of a cache line, such as 75% into the cache line, a line of instructions from the next level of the memory hierarchy is prefetched. The percentage X into the cache line may be fixed with a value chosen by experimental means or may be programmable, allowing the X % to be adapted to a program in operation. For example, if X % is 62.5% for the exemplary illustration of FIG. 2, with an eight instruction line 210, 62.5% of the line is associated with I4 216, five instructions into the line. If a miss occurs at a fetch address of I4 216 or greater, a prefetch operation is enabled. If the miss occurs at a fetch address of I3 215 or less, the prefetch operation is not enabled. In an alternative implementation, if the miss in the instruction cache is due to a miss at an address greater than X % into the cache line, then a prefetch is done. For the above example of X %=62.5%, a prefetch is enabled if the miss occurs at a fetch address of I5 217 or greater. Otherwise, if the miss is at an address less than or equal to I4 216 into the cache line, a prefetch is not done.

In another embodiment, the miss attributes may be combined to determine whether to prefetch or not. For example, if the miss in the instruction cache is due to a non-sequential miss, such as a branch, sub-routine call, or the like, to an address of an instruction that is not present in the instruction cache, or if the miss in the instruction cache occurs at an address in the instruction cache that is even, then a line of instructions from the next level of the memory hierarchy is prefetched. Otherwise, on the miss, a prefetch is not done.

The determination of whether to prefetch is accomplished with prefetch decision logic 246 which may operate in parallel with a cache access probe to determine whether an addressed instruction is in the cache or not. The prefetch decision logic 246 may take as input a miss indication 248, a non-sequential indication 250 that a non-sequential operation caused the miss, such as a branch, call, or return operation, an X % value 252, and may include the IA 224 of the fetched instruction, for example. The miss indication 248, the non-sequential indication 250, and the X % value 252 are provided by the L1 Icache control unit 206. A determination that the miss is associated with a fetch address for a non-sequential fetch operation may be obtained from controls 254 from the processor 202. The controls 254 may further be obtained from logic for non-sequential operations 256 associated with instructions, such as, branches, calls, returns, or the like. Alternatively, the L1 Icache control unit 206 may compare a present fetch instruction address with a previous fetch instruction address to determine whether a fetch is associated with a non-sequential operation. It is noted that the prefetch decision logic 246 may be located external to the instruction cache with signals connected as required. For example, the prefetch decision logic may be more closely associated with the processor 202 that generates the instruction address 224.

Other attributes, such as determining whether the fetch address is to an even address cache line may be based on the even "E" bit 230 in which E=0 for an even cache line. The "E" bit 230 address bit position or value may vary depending upon the line length in the instruction cache line array 204. As illustrated in FIG. 2, the B field 234 of two bits indicates up to four bytes in a word and the I field 232 of three bits indicates up to eight words in a line. With this arrangement, the "E" bit 230 changes state every eight words that are addressed for a 32-byte cache line.

In a further embodiment, the prefetch decision logic 246 may cause a probe of the cache to determine whether the cache line to be prefetched is already in the instruction cache. If the cache line associated with the prefetch target is already in the cache, the prefetch operation is stopped or precluded from starting.

Once a prefetch has been initiated by prefetch logic associated with the instruction cache and is responded to by the higher level of the memory hierarchy, multiple lines of instructions may be transferred to the L1 Icache over a memory data bus, such as, memory data bus 244. Depending upon the physical bus width of the memory data bus interface 244 and signaling protocols implemented, data may be transferred in fixed size quantities or packets, such as, 32-bytes, 64-bytes, 128-bytes, 256-bytes, 512-bytes, and so on. Generally, multiple transfers of short data packets are usually less efficient than having burst transfers of larger packet sizes, due to overhead in configuring and sending the data. Accordingly, in another embodiment, when a decision is reached to prefetch, instead of prefetching two lines of instructions, for example, in two individual data transfers, a long data transfer is requested. The long data transfer on prefetch minimizes the overall transfer time as compared to sending the instructions in shorter separate transfers.

Figure 3:
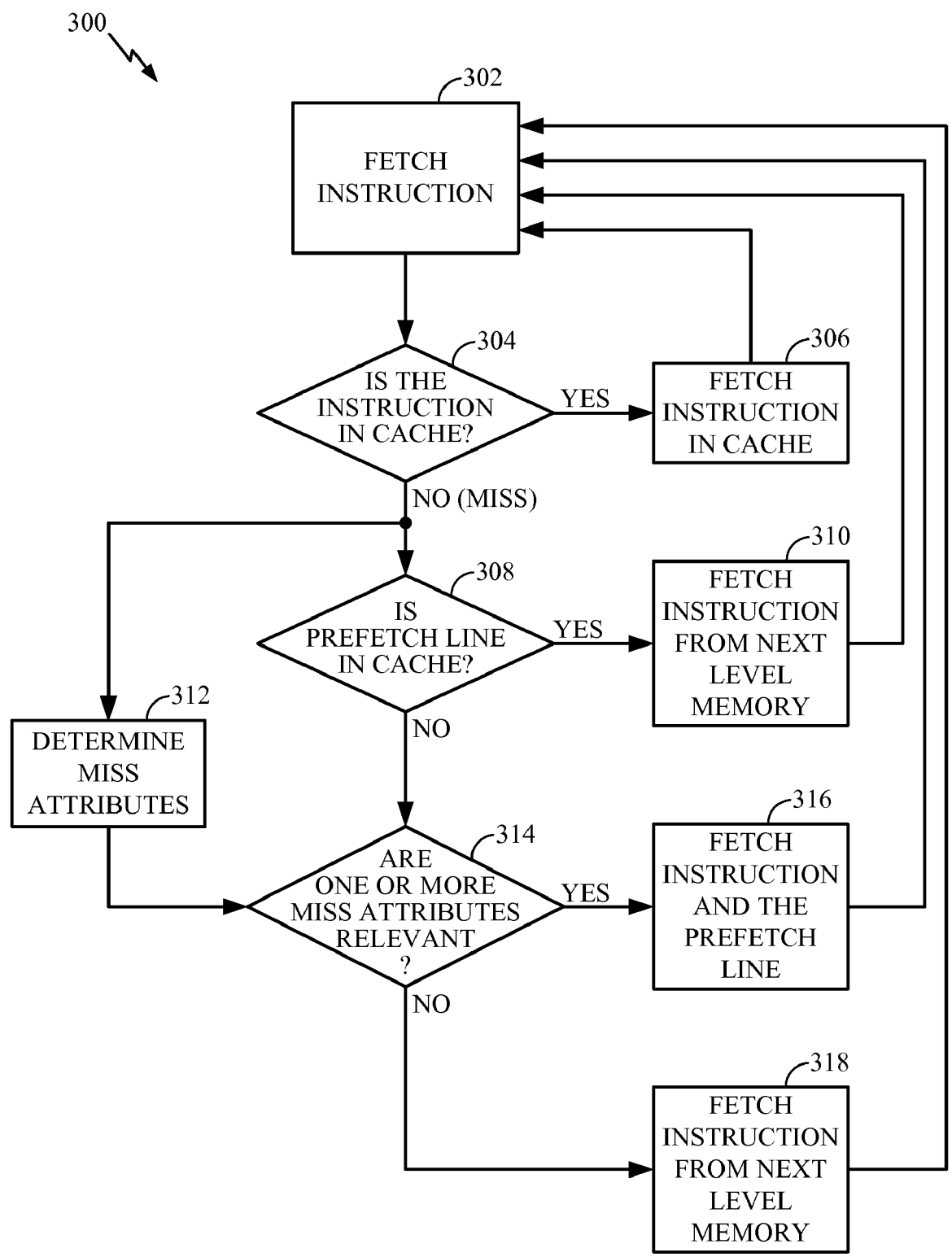
FIG. 3 is a flow chart showing a low complexity prefetch process.

FIG. 3 is a flow chart showing a low complexity prefetch process 300. Exemplary relationships between the blocks of FIG. 3 and the elements of FIG. 2 are indicated by describing how elements from the processor memory complex 200 may suitably cooperate to perform the method 300.

A processor, such as processor 202, fetches an instruction in block 302. In decision block 304, it is determined whether the instruction being fetched resides in the instruction cache. For example, the L1 Icache control unit 206 checks to see if the instruction is present. If the instruction is in the instruction cache, the process 300 fetches the instruction in the cache in block 306 and then returns to block 302 to wait for the next instruction fetch. For example, the selected instruction is placed on instruction out bus 240 and received in processor 202.

If the instruction is not in the instruction cache, then a miss situation has been detected. The process 300 proceeds to decision block 308, where it is determined whether the next consecutive line associated with the current instruction address is already in the instruction cache. Such determination may be accomplished in the L1 Icache control unit 206 without having to directly access the L1 Icache line array 204. If the next consecutive line is already in the L1 Icache, a fetch is issued to the memory hierarchy in block 310, such as system memory hierarchy 208, for the current instruction address. The process 300 then returns to block 302 to wait for the next instruction fetch. In parallel, the attributes of the fetch address that caused the miss are determined in block 312. Such determination may suitably be accomplished in prefetch decision logic 246.

If the next consecutive line is not in the cache, then the process proceeds to decision block 314, where it is determined whether one or more of the miss attributes, that were determined in block 312, are relevant. While multiple attributes may be determined, a fixed or programmable function may select a subset of or all of the attributes to apply. If the miss attributes are relevant, the process 300 proceeds to block 316 to fetch the instruction and a determined prefetch cache line from the next level memory and return to block 302 to wait for the next instruction fetch. Accordingly, when a decision is reached to prefetch in decision block 314, instead of prefetching two lines of instructions, for example, in two individual data transfers, a long data transfer is requested. If the miss attributes are not relevant, a fetch is issued to the memory hierarchy in block 318, such as system memory hierarchy 208, for the current instruction address. The process 300 then returns to block 302 to wait for the next instruction fetch.

The exemplary discussion of embodiments disclosed herein were illustrated with a direct mapped cache implementation. It is noted that a direct mapped cache may be considered a special case of a set associative cache, such as a one way set associative cache. The principles described herein are also applicable to an N-way set associative cache, such as, for example, a 4 way set associative cache implementation. In a similar manner, the principles described herein are applicable to a fully associative cache implementation.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, for example, a combination of a DSP and a microprocessor, a plurality of microprocessors, one or more microprocessors in conjunction with a DSP core, or any other such configuration.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While the invention is disclosed in the context of embodiments, it will be recognized that a wide variety of implementations may be employed by persons of ordinary skill in the art consistent with the above discussion and the claims which follow below. For example, the embodiments are disclosed mainly in the context of a level 1 instruction cache. It will be appreciated that the embodiments may also be employed with a level 2 instruction cache, a level 2 unified cache for prefetching instructions, or at other levels of the memory hierarchy as appropriate for the processor memory complex. It will also be appreciated that the instruction cache may be integrated with a processor core or external to the processor core.

What is claimed is:

1. A method for instruction prefetch comprising:
  receiving an indication of a miss of a fetch address of an instruction in a first cache, wherein the fetch address of the instruction results from a first operation and corresponds to a second operation; and
  in response to the indication:
    fetching a first line of instructions that includes instruction from a second cache based on the fetch address and prefetching a second line of instructions from the second cache conditioned on the first operation being non-sequential; and
    fetching the first line of instructions from the second cache based on the fetch address without prefetching the second line of instructions from the second cache in response to the first operation being sequential.

2. The method of claim 1, wherein prefetching further comprises enabling a long data transfer by combining the fetching of the first line of instructions with the prefetching of the second line of instructions.

3. The method of claim 1, wherein the first operation is identified to be non-sequential by logic in a processor coupled to the first cache.

4. The method of claim 1, wherein the first operation is identified to be non-sequential by comparing the fetch address of the instruction with a previous fetch address.

5. The method of claim 1, wherein the first operation is a branch operation.

6. The method of claim 1, wherein the second line of instructions is prefetched further conditioned on a position of the instruction in the first line of instructions with respect to a predefined threshold position in the first line of instructions.

7. The method of claim 1, wherein the second line of instructions is prefetched further conditioned on the fetch address corresponding to an even cache line of the second cache, wherein the second cache comprises one or more even cache lines and one or more odd cache lines.

8. The method of claim 1, wherein the second line of instructions is non-consecutive to the first line of instructions.

9. The method of claim 1, wherein the first operation is non-sequential and includes a subroutine call operation.

10. The system of claim 1, wherein the first operation is non-sequential and includes a return operation.

11. A system comprising:
  an instruction cache configured to generate a notification that a fetch address of an instruction missed in the instruction cache, wherein the fetch address of the instruction results from a first operation and corresponds to a second operation;

fetch logic configured to fetch a first line of instructions from a second cache based on the fetch address, wherein the first line of instructions includes the instruction; and prefetch decision logic configured to in response to the notification:

prefetch a second line of instructions from the second cache conditioned on the first operation being a non-sequential access; and refrain from prefetching the second line of instructions from the second cache in response to the first operation being a sequential access.

12. The system of claim 11, further comprising:
a cache control unit configured to determine whether the first operation is non-sequential.

13. The system of claim 11, wherein the prefetched second line of instructions is provided in a burst transfer to the instruction cache.

14. The system of claim 11, wherein the second line of instructions is consecutive to the first line of instructions.

15. The system of claim 11, wherein the second line of instructions is non-consecutive to the first line of instructions.

16. A method comprising:
receiving a notification that a fetch address of an instruction missed in a first cache, wherein the fetch address of the instruction results from a first operation and corresponds to a second operation;
in response to the notification:
fetching a first line of instructions that includes the instruction from a second cache based on the fetch address and prefetching a second line of instructions from the second cache conditioned on the first operation being non-sequential and a fetch address cache line position exceeding a threshold cache line position, wherein the fetch address cache line position is associated with the fetch address of the instruction and the threshold cache line position is associated with the first line of instructions; and fetching the first line of instructions from the second cache based on the fetch address without prefetching the second line of instructions in response to the first operation being non-sequential and the fetch address cache line position failing to exceed the threshold cache line position.

17. The method of claim 16, wherein the second line of instructions is prefetched further conditioned on the fetch address corresponding to an even cache line of the second cache, wherein the second cache comprises at least one even cache line and at least one odd cache line.

18. The method of claim 16, wherein the second line of instructions is non-consecutive to the first line of instructions.

19. A method comprising:
receiving an indication of a miss of a fetch address of an instruction in a first cache, wherein the fetch address of the instruction results from a first operation and corresponds to a second operation; and
in response to the indication:
fetching a first line of instructions that includes the instruction from a second cache based on the fetch address and prefetching a second line of instructions from the second cache conditioned on the fetch address corresponding to an even cache line of the second cache; and
fetching the first line of instructions from the second cache based on the fetch address and refraining from prefetching the second line of instructions from the second cache in response to the fetch address corresponding to an odd cache line of the second cache.

20. The method of claim 19, wherein the second line of instructions is consecutive to the first line of instructions.

21. The method of claim 19, wherein the second line of instructions is non-consecutive to the first line of instructions.

* * * * *